US012701081B2

(12) United States Patent
Ye

(10) Patent No.: US 12,701,081 B2
(45) Date of Patent: Aug. 4, 2026

(54) COMMUNICATION METHOD AND APPARATUS

(71) Applicant: New H3C Technologies Co., Ltd., Zhejiang (CN)

(72) Inventor: Jinrong Ye, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 66 days.

(21) Appl. No.: 19/022,484

(22) Filed: Jan. 15, 2025

(65) Prior Publication Data

US 2025/0323867 A1 Oct. 16, 2025

(30) Foreign Application Priority Data

Apr. 16, 2024 (CN) .......................... 202410459475.0

(51) Int. Cl.
| | |
|---|---|
| *H04L 45/745* | (2022.01) |
| *H04L 45/02* | (2022.01) |
| *H04L 45/28* | (2022.01) |
| *H04L 61/5007* | (2022.01) |

(52) U.S. Cl.
CPC ............ H04L 45/745 (2013.01); H04L 45/28 (2013.01); *H04L 45/02* (2013.01); *H04L 61/5007* (2022.05)

(58) Field of Classification Search
CPC ..... H04L 45/745; H04L 45/28; H04L 45/247; H04L 45/74; H04L 45/48; H04L 45/24; H04L 45/02; H04L 61/5007; H04L 49/1569; Y02D 30/00
See application file for complete search history.

(56) References Cited

U.S. PATENT DOCUMENTS

| | | | | |
|---|---|---|---|---|
| 9,544,185 B1* | 1/2017 | Yadav | ..................... | H04L 45/28 |
| 10,374,956 B1* | 8/2019 | Tracy | .................. | H04L 12/4633 |
| 11,134,006 B2* | 9/2021 | Malhotra | ................ | H04L 45/02 |
| 2013/0215754 A1* | 8/2013 | Tripathi | ............ | H04L 45/74591 |
| | | | | 370/352 |
| 2014/0376373 A1* | 12/2014 | Deshpande | ............. | H04L 47/12 |
| | | | | 370/235 |

(Continued)

FOREIGN PATENT DOCUMENTS

| | | | | |
|---|---|---|---|---|
| CN | 110113260 A | 8/2019 | | |
| CN | 110113260 B | * 7/2021 | ........... | H04L 45/745 |

(Continued)

*Primary Examiner* — Richard G Keehn

(74) *Attorney, Agent, or Firm* — McDonnell Bohnen Hulbert & Berghoff LLP

(57) ABSTRACT

In an example, a spine node may receive a first internet protocol (IP) packet sent by the first leaf through a first interface. The spine node may obtain a forwarding entry for forwarding the first IP packet; wherein, the forwarding entry comprises a fast bypass tag field and an egress interface field instructing a second interface for forwarding the first IP packet. The spine node may determine a third interface from a fast recovery leaf node group in response to determining that the second interface fails and the value of the fast bypass tag field is a first value, wherein the third interface is different from the second interface and is connected to a second leaf node. The spine node may send a second IP packet, which includes a destination media access control (MAC) address and the first IP packet, to the second leaf node through the third interface.

14 Claims, 4 Drawing Sheets

(56)                    References Cited

U.S. PATENT DOCUMENTS

| | | | | |
|---|---|---|---|---|
| 2016/0373530 A1* | 12/2016 | Duda | ..................... | H04L 45/02 |
| 2022/0103660 A1* | 3/2022 | Xu | ........................ | H04L 45/24 |
| 2023/0198896 A1* | 6/2023 | Zhou | ..................... | H04L 45/02 |
| | | | | 370/392 |
| 2025/0310256 A1* | 10/2025 | Xiang | .................. | H04L 45/745 |
| 2025/0323867 A1* | 10/2025 | Ye | ....................... | H04L 45/745 |
| 2026/0032040 A1* | 1/2026 | Shi | ........................ | H04L 45/02 |

FOREIGN PATENT DOCUMENTS

| | | | | | |
|---|---|---|---|---|---|
| CN | 113852548 A | * | 12/2021 | ............ | H04L 45/74 |
| CN | 115460137 A | * | 12/2022 | ............ | H04L 45/54 |
| CN | 115701054 A | | 2/2023 | | |
| WO | WO-2016101469 A1 | * | 6/2016 | | |

* cited by examiner

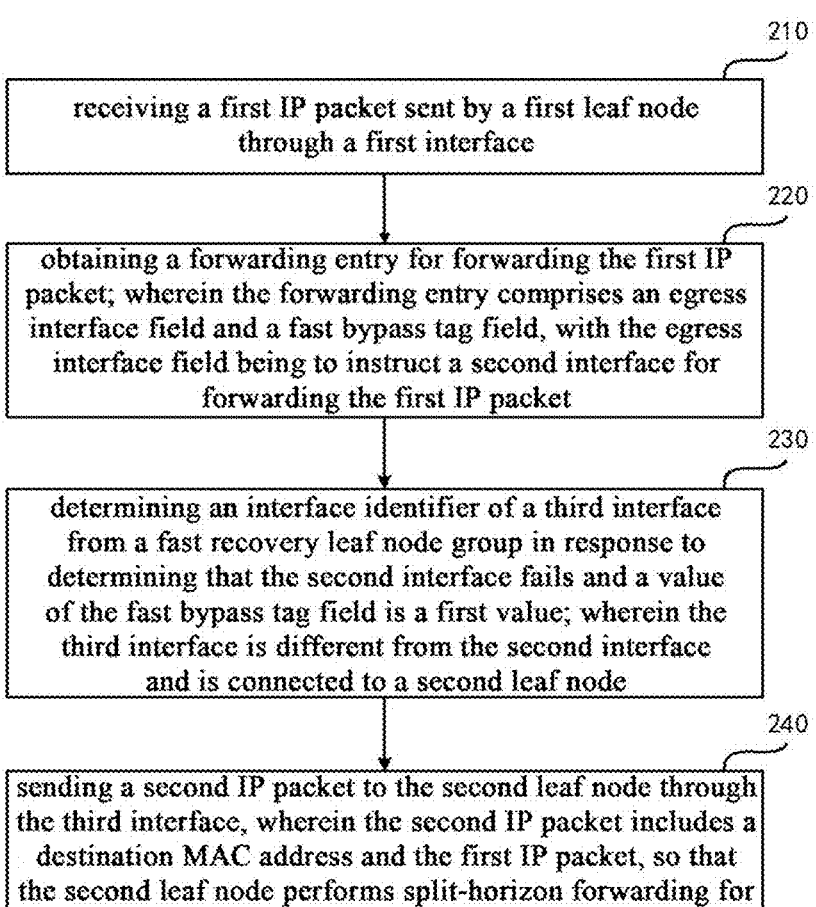

210 receiving a first IP packet sent by a first leaf node through a first interface

220 obtaining a forwarding entry for forwarding the first IP packet; wherein the forwarding entry comprises an egress interface field and a fast bypass tag field, with the egress interface field being to instruct a second interface for forwarding the first IP packet

230 determining an interface identifier of a third interface from a fast recovery leaf node group in response to determining that the second interface fails and a value of the fast bypass tag field is a first value; wherein the third interface is different from the second interface and is connected to a second leaf node

240 sending a second IP packet to the second leaf node through the third interface, wherein the second IP packet includes a destination MAC address and the first IP packet, so that the second leaf node performs split-horizon forwarding for the second IP packet based on the destination MAC address

FIG. 2 communication apparatus 410    420    430    440

| receiving unit | first obtaining unit | determining unit | sending unit |

510 processor

520 transceiver bus

530 machine-readable storage medium network apparatus

1

COMMUNICATION METHOD AND APPARATUS

CROSS-REFERENCE TO RELATED APPLICATIONS

The present application claims the priority to a Chinese patent application No. 202410459475.0 filed with the China National Intellectual Property Administration on Apr. 16, 2024, which is incorporated herein by reference in its entirety.

TECHNICAL FIELD

The present disclosure relates to the field of communication technology, particularly to a communication method and apparatus.

BACKGROUND

In spine-leaf architecture network of related art, multiple equal-cost multi-path (ECMP) routing paths exist between a pair of leaf nodes for forwarding service traffic. As shown in FIG. 1, which is a schematic diagram of related spine-leaf topology architecture network, there are multiple ECMP paths between leaf1 and leaf3, for example, leaf1-spine1-leaf3 and leaf1-spine2-leaf3.

In response to determining the downlink between spine1 and leaf3 fails, leaf1, unaware of the link failure, will continue to forward traffic to leaf3 through ECMP. Service traffic forwarded through the downlink between spine1 and leaf3 will result in packet loss. After spine1 sends a route deletion to leaf1, control plane of leaf1 performs route convergence.

After leaf1 completes route convergence, service traffic is switched to another upstream path. However, relying on the control plane to perform route convergence results in slower convergence speeds. During the route convergence process, there will be flow interruptions, which often last from tens to hundreds of milliseconds.

SUMMARY

In view of this, the present disclosure provides a communication method and apparatus to address the issues of flow interruption and slow convergence that arise when existing leaf nodes rely on the control plane for route convergence.

In some examples, a communication method applied to a spine node in a spine-leaf architecture network, which further comprises a first leaf node is provided, the method comprising:

receiving a first internet protocol (IP) packet sent by a first leaf node through a first interface;

obtaining a forwarding entry for forwarding the first IP packet; wherein the forwarding entry comprises an egress interface field and a fast bypass tag field, and the egress interface field being to instruct a second interface for forwarding the first IP packet;

determining a third interface from a fast recovery leaf node group in response to determining that the second interface fails and a value of the fast bypass tag field is a first value; wherein the third interface is different from the second interface and is connected to a second leaf node;

sending a second IP packet to the second leaf node through the third interface, the second IP packet comprising a destination media access control (MAC) address and the first IP packet, so that the second leaf node performs split-horizon forwarding for the second IP packet based on the destination MAC address.

In some examples, a communication apparatus applied to a spine node in a spine-leaf architecture network further comprising a first leaf node is provided, the apparatus comprising:

a receiving unit, to receive a first IP packet sent by a first leaf node through a first interface;

a first obtaining unit, to obtain a forwarding entry for forwarding the first IP packet; wherein the forwarding entry comprises an egress interface field and a fast bypass tag field, with the egress interface field being to instruct a second interface for forwarding the first IP packet;

a determining unit, to determine a third interface from a fast recovery leaf node group in response to determining that the second interface fails and the value of the fast bypass tag field is a first value; wherein the third interface is different from the second interface and is connected to a second leaf node;

a sending unit, to send a second IP packet to the second leaf node through the third interface, the second IP packet comprising a destination MAC address and the first IP packet, so that the second leaf node performs split-horizon forwarding for the second IP packet based on the destination MAC address.

Therefore, by applying the communication method and apparatus provided in the present disclosure, a spine node receives a first IP packet sent by a first leaf node through a first interface. The spine node obtains a forwarding entry for forwarding the first IP packet, which includes an egress interface field and a fast bypass tag field. The egress interface field instructs a second interface for forwarding the first IP packet. In response to determining that the second interface is faulty and the value of the fast bypass tag field is the first value, the spine node determines a third interface from the fast recovery leaf node group, which is different from the second interface and connected to a second leaf node. The spine node sends a second IP packet through the third interface to the second leaf node, which includes the destination MAC address and the first IP packet, so that the second leaf node performs split-horizon forwarding for the second IP packet based on the destination MAC address.

In this way, in response to determining that a link fails, fast bypass protection switching is achieved at the data plane, with sub-millisecond fast recovery for CPU forwarding within the network apparatus and microsecond-scale or faster recovery speed for hardware forwarding chips. This solves the problems of flow interruption and slow convergence in response to determining that existing leaf nodes rely on the control plane for route convergence.

BRIEF DESCRIPTION OF THE DRAWINGS

FIG. 2 is a schematic diagram of the communication method provided in an example of the present disclosure;

DETAILED DESCRIPTION

Figure 1:
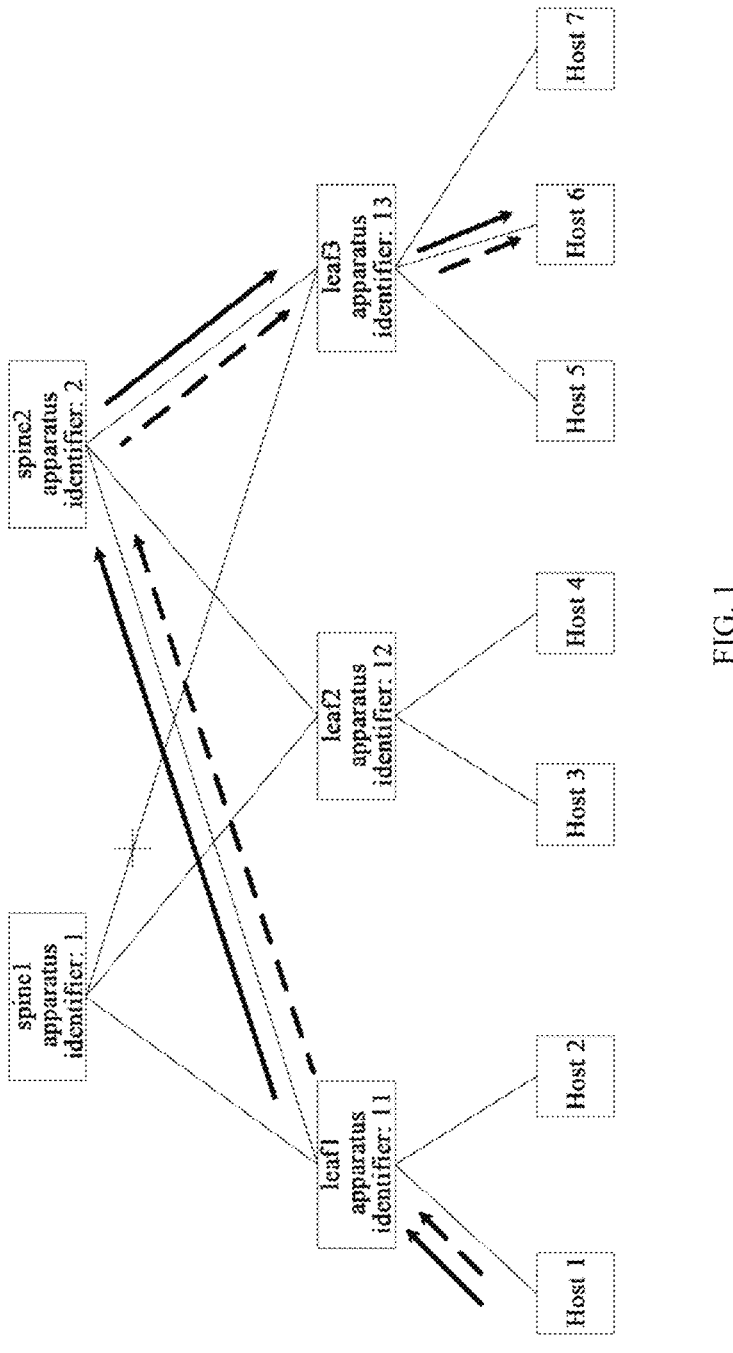
FIG. 1 is a schematic diagram of related spine-leaf topology architecture network.

Here, exemplary examples will be described in detail with examples shown in the drawings. In response to determining the following description refers to the drawings, unless otherwise instructed, the same numbers in different drawings represent the same or similar elements. The examples described in the following exemplary examples do not represent all examples consistent with the present disclosure. Rather, they are merely examples of apparatuses and methods consistent with some aspects of the present disclosure, as detailed in the accompanying claims.

The terms used in the present disclosure are solely for the purpose of describing specific examples and are not intended to limit the present disclosure. The singular forms "a," "said," and "the" used in the present disclosure and the accompanying claims are also intended to include plural forms, unless the context clearly instructs otherwise. It should also be understood that the term "and/or" used herein refers to any or all possible combinations of the corresponding listed items.

It should be understood that although terms such as first, second, third, etc., may be used in the present disclosure to describe various information, these terms should not be limited to these terms. These terms are only used to distinguish one type of information from another. For example, without departing from the scope of the present disclosure, first information may also be referred to as second information, and similarly, second information may also be referred to as first information. Depending on the context, the word "if" as used herein may be interpreted as "when", "in a case that" or "in response to determining that".

Below is a detailed description of the communication method provided in an example of the present disclosure. As shown in FIG. 2, which presents a communication method provided in an example of the present disclosure. The method is applied to a spine node. The communication method provided in an example of the present disclosure may include the following blocks.

Block 210: receiving a first IP packet sent by a first leaf node through a first interface.

In some examples, the spine is located within a spine-leaf architecture network, which also includes multiple other spine nodes and multiple leaf nodes. Each spine node is full-connected to each leaf node, and each leaf node is connected to multiple hosts.

The following description takes a first spine node and the first leaf node within the spine-leaf architecture network as examples.

The first leaf node receives a first IP packet sent by a user side, finds a forwarding entry matching with a destination IP address of the first IP packet, and sends the first IP packet to the first spine node based on the forwarding entry, matching with the destination IP address of the first IP packet.

The first spine node receives the first IP packet through the first interface and obtains the destination IP address from the first IP packet.

Block 220: obtaining a forwarding entry for forwarding the first IP packet; wherein the forwarding entry comprises an egress interface field and a fast bypass tag field, with the egress interface field being to instruct a second interface for forwarding the first IP packet.

In some examples, based on the description in block 210, after obtaining the destination IP address, the first spine node searches a local forwarding table based on the destination IP address and obtains a forwarding entry matching the destination IP address from the local forwarding table. The forwarding entry includes an egress interface field and a fast bypass tag field, where the egress interface field is to instruct a second interface for forwarding the first IP packet.

It may be understood that the forwarding entry also includes other fields, in some examples, a next hop field.

Block 230: determining an interface identifier of a third interface from a fast recovery leaf node group in response to determining that the second interface fails and a value of the fast bypass tag field is a first value; wherein the third interface is different from the second interface and is connected to a second leaf node.

In some examples, based on the description in block 220, after obtaining the egress interface field and the fast bypass tag field, in response to determining that the second interface is faulty and the value of the fast bypass tag field is a first value (e.g., the first value is 1), the first spine node determines a third interface from the fast recovery leaf node group and obtains an interface identifier of the third interface. The third interface is different from the second interface and is connected to the second leaf node.

Where, a third leaf node within the spine-leaf architecture network is connected to the second interface. After a link between the first spine node and the third leaf node fails, the status of the second interface changes to down. The fast bypass tag field is to instruct that in response to determining that an interface is faulty, the first spine node may forward IP packets through another interface at the forwarding plane instead of forwarding IP packets through the faulty interface.

The value of the aforementioned fast bypass tag field is 1 or 0. Setting the value to 1 instructs that fast bypassing is enabled after the egress interface fails; setting the value to 0 instructs that fast bypassing is not enabled after the egress interface fails.

It may be understood that in response to determining that the first spine node determines the third interface from the fast recovery leaf node group, faulty interfaces are excluded and all remaining interfaces are obtained. Among the remaining interfaces, an interface may be selected as the third interface using an existing flow-based hash method.

In an example of the present disclosure, the third interface may be the same as the first interface, and the second leaf node may be the same as the first leaf node.

In response to determining that the IP packet received by the first spine node is not from a leaf node (e.g., from an upstream network apparatus of the first spine node), the first spine node does not need to exclude any interfaces in response to determining the third interface.

Block 240: sending a second IP packet to the second leaf node through the third interface, wherein the second IP packet includes a destination MAC address and the first IP packet, so that the second leaf node performs split-horizon forwarding for the second IP packet based on the destination MAC address.

In some examples, based on the description in block 230, after determining that the second interface is faulty and the value of the fast bypass tag field is the first value, the first spine node encapsulates an Ethernet header on the outer layer of the first IP packet. The Ethernet header includes a source MAC address field, a destination MAC address field, and a type field.

Where, the destination MAC address field is filled with a MAC address stored in a fast recovery destination MAC address field included in the fast recovery leaf node group. The source MAC address field is filled with the MAC address of the third interface. The type field is filled with the network protocol applied to the upper layer.

The first spine node generates a second IP packet, which includes the destination MAC address and the first IP packet.

After obtaining the interface identifier of the third interface, the first spine node sends the second IP packet to the second leaf node through the third interface instructed by the interface identifier. After receiving the second IP packet, the second leaf node obtains the destination MAC address from the second IP packet. The second leaf node determines the destination MAC address being the MAC address of its own interface or a preconfigured MAC address.

In response to determining that the destination MAC address is a preconfigured MAC address, the second leaf node determines to perform split-horizon forwarding for the second IP packet. The second leaf node apparatus strips the Ethernet header from the second IP packet to obtain the first IP packet. Based on the destination IP address included in the first IP packet, the second leaf node searches a local forwarding table to perform split-horizon forwarding. After obtaining multiple egress interfaces by searching the local forwarding table, the second leaf node apparatus excludes the interface that received the second IP packet and obtains all remaining interfaces. Among the remaining interfaces, an interface may be selected as the interface for forwarding the first IP packet using an existing flow-based hash method.

In some examples, before the first spine node performs block 210, the first spine node will also perform the following process.

In some examples, each spine node in the spine-leaf architecture network collects apparatus role information of each direct-connected network apparatus, generates a topology structure table at local, and establishes a fast recovery leaf node group at the data plane.

Below, the first spine node is taken as an example for illustration. The performing process for other spine nodes in the spine-leaf architecture network is the same and will not be repeated here.

Each network apparatus within the spine-leaf architecture network generates a link layer discovery protocol (LLDP) packet and sends the LLDP packet to the direct-connected peer network apparatus. This LLDP packet includes apparatus role information, which instructs the role of the network apparatus sending the LLDP packet within the spine-leaf architecture network.

It is understandable that in response to determining that a network apparatus is not configured with a role within the spine-leaf architecture network, then the LLDP packet will not carry a field including the apparatus role information.

The first spine node receives the LLDP packet sent by each direct-connected network apparatus and obtains the apparatus role information from each LLDP packet. The first spine node generates a topology structure entry at local and stores the topology structure entry in a topology structure table. The topology structure entry includes an interface identifier field and a peer apparatus role field.

In the example of the present disclosure, the topology structure entry also includes a peer apparatus identifier, which includes a chassis identifier and an interface identifier. Where, the chassis identifier is represented by a bridge MAC address. As shown in Table 1 below.

TABLE 1

| Topology Structure Table | | |
| --- | --- | --- |
| Local Interface | Peer Apparatus Role | Peer Apparatus Identifier (Chassis Identifier + Interface Identifier) |
| Port1 | leaf | MAC1 + GigabitEthernet5/0/47 |
| Port2 | leaf | MAC2 + GigabitEthernet3/1/25 |
| Port3 | leaf | MAC3 + GigabitEthernet1/0/19 |
| Port4 | Others | MAC4 + GigabitEthernet2/0/30 |

The user inputs a first configuration instruction to the first spine node, which includes a fast recovery destination MAC address field. The first spine node receives the first configuration instruction and extracts the fast recovery destination MAC address field from the first configuration instruction.

The first spine node issues the topology structure entry with a peer apparatus role field indicating "leaf" from its topology structure table to the data plane and establishes a fast recovery leaf node group on the data plane. This fast recovery leaf node group includes an interface identifier field, a peer apparatus role field, and a fast recovery destination MAC address field. Where, the MAC address stored in the fast recovery destination MAC address field is to populate the destination MAC address in the second IP packet. As shown in Table 2 below.

TABLE 2

| Fast Recovery Leaf Node Group | | |
| --- | --- | --- |
| Local Interface | Peer Apparatus Role | Fast Recovery Destination MAC Address |
| Port1 | leaf | Multicast Address: 01-0F-E2-00-00-2E, or |
| Port2 | leaf | another MAC address, can be specified |
| Port3 | leaf | through the configuration interface. |

In some examples, the aforementioned fast recovery leaf node group may also be generated through a second configuration instruction input by the user.

In some examples, the user inputs a second configuration instruction to the first spine node, which includes an interface identifier field, a peer apparatus role field, and the fast recovery destination MAC address field. The first spine node receives the second configuration instruction and extracts the interface identifier field, the peer apparatus role field, and the fast recovery destination MAC address field from the second configuration instruction.

The first spine node establishes a fast recovery leaf node group on the data plane, which includes an interface identifier field, the peer apparatus role field, and the fast recovery destination MAC address field. Among them, the peer apparatus role field instructs that the role of the peer apparatus is "leaf", and the MAC address stored in the fast recovery destination MAC address field is used to populate the destination MAC address in the second IP packet. As shown in Table 2 above.

In some examples, the method also includes a process of the first spine node adding a fast bypass tag field in forwarding entry.

In some examples, in response to determining generating a forwarding entry to reach a destination host based on the existing method, the first spine node determines a fourth interface for forwarding IP packets to the destination host. Based on the interface identifier of the fourth interface, the first spine obtains a matching fast recovery leaf node group entry from the fast recovery leaf node group. In response to determining that the fast recovery leaf node group entry instructs that the peer apparatus connected to the fourth interface has a role of "leaf", the first spine node adds a fast bypass tag field to the forwarding entry and sets the value of the fast bypass tag field to a first value.

In some examples, in response to the first spine node determines that a second interface is faulty, the first spine node maintains the forwarding entry within a preset time. That is, the first spine node does not delete the forwarding entry. The preset time may be 6 seconds.

In some examples, the first IP packet includes a destination IP address. After determining that the link between the first spine node and a third leaf node is faulty, the first spine node determines that the third leaf node is unreachable. The first spine node generates and sends a route deletion packet to leaf1. Leaf1 deletes a host route to each host accessed by leaf3 at local based on the route deletion packet.

The first spine node performs convergence processing on the host route to the destination IP address based on the existing process and updates the forwarding entry based on the converged host route.

In response to determining that the forwarding entry is not updated within the preset time, the first spine node deletes the forwarding entry.

Therefore, by applying the communication method and apparatus provided in the present disclosure, a spine node receives a first IP packet sent by a first leaf node through a first interface. The spine node obtains a forwarding entry for forwarding the first IP packet, which includes an egress interface field and a fast bypass tag field. The egress interface field instructs a second interface for forwarding the first IP packet. In response to determining that the second interface is faulty and the value of the fast bypass tag field is the first value, the spine node determines a third interface from the fast recovery leaf node group, which is different from the second interface and connected to a second leaf node. The spine node sends a second IP packet through the third interface to the second leaf node, which includes the destination MAC address and the first IP packet, so that the second leaf node performs split-horizon forwarding for the second IP packet based on the destination MAC address.

In this way, in response to determining that a link fails, fast bypass protection switching is achieved at the data plane, with sub-millisecond fast recovery for CPU forwarding within the network apparatus and microsecond-scale or faster recovery speed for hardware forwarding chips. This solves the problems of flow interruption and slow convergence in response to determining that existing leaf nodes rely on the control plane for route convergence.

Below is a detailed explanation of the communication method provided in the example of the present disclosure. Please refer to FIG. 3, which illustrates the spine-leaf topology architecture network diagram provided in the example of the present disclosure. The spine-leaf architecture network includes Spine1, Spine2, Spine3, Leaf1, Leaf2, and Leaf3. Each spine node is full-connected to each leaf node, and multiple hosts are connected to each leaf node. Host 1 and Host 2 are connected to Leaf1, Host 3 and Host 4 are connected to leaf2, and Host 5, Host 6, and Host 7 are connected to Leaf3.

Each spine node in the spine-leaf architecture network collects the apparatus role information of each direct-connected network apparatus, generates a topology structure table at local, and establishes a fast recovery leaf node group on the data plane.

Spine1 is taken as an example for explanation. The performing process for other spine nodes in the spine-leaf architecture network is the same and will not be repeated here.

Each network apparatus within the spine-leaf architecture network generates an LLDP packet and sends the LLDP packet to its direct-connected peer network apparatus. The LLDP packet includes apparatus role information, which instructs the role of the network apparatus sending the LLDP packet within the spine-leaf architecture network.

It is understandable that in response to determining that a network apparatus is not configured with a role within the spine-leaf architecture network, the LLDP packet will not carry a field carrying the apparatus role information.

Spine1 receives the LLDP packet sent by direct-connected Leaf1, Leaf2, and Leaf3, and obtains apparatus role information from each LLDP packet. Spine1 generates a topology structure entry at local and stores the topology structure entry in the topology structure table. The topology structure entry includes an interface identifier field and a peer apparatus role field.

In the example of the present disclosure, the topology structure entry also includes a peer apparatus identifier, which includes a chassis identifier and an interface identifier. The chassis identifier is represented using the bridge MAC address. As shown in Table 3 below.

TABLE 3

| | Topology Structure Table | |
|---|---|---|
| Local Interface | Peer Apparatus Role | Peer Apparatus Identifier (Chassis Identifier + Interface Identifier) |
| Port1 | leaf | MAC1 + GigabitEthernet5/0/47 |
| Port2 | leaf | MAC2 + GigabitEthernet3/1/25 |
| Port3 | leaf | MAC3 + GigabitEthernet1/0/19 |

The user inputs configuration instruction 1 to Spine1, which includes a fast recovery destination MAC address field. Spine1 receives configuration instruction 1 and obtains the fast recovery destination MAC address field from the configuration instruction 1.

Spine1 distributes the topology structure entry with the peer apparatus role field as "leaf" from the topology structure table to the data plane and establishes a fast recovery leaf node group on the data plane. This fast recovery leaf node group includes an interface identifier field, a peer apparatus role field, and a fast recovery destination MAC address field. Among them, the MAC address stored in the fast recovery destination MAC address field is to populate the destination MAC address in the second IP packet. As shown in Table 4 below.

TABLE 4

| | Fast Recovery Leaf Node Group | |
|---|---|---|
| Local Interface | Peer Apparatus Role | Fast Recovery Destination MAC Address |
| Port1 | leaf | Multicast Address: 01-0F-E2-00-00-2E, or |
| Port2 | leaf | another MAC address, can be specified |
| Port3 | leaf | through the configuration interface. |

Leaf3 sends the host route for Host 6 to Spine1. In response to determining that the Spine1 generates the forwarding entry to reach Host 6 in the existing manner, Spine1 determines the interface to forward IP packets to Host 6 is Port3. Based on Port3, Spine1 obtains the fast recovery leaf node group entry that matches Port3 from the fast recovery leaf node group; the fast recovery leaf node group entry instructs that the peer apparatus connected to Port3 is a "leaf". Spine1 adds a fast bypass tag field to the forwarding entry and sets the value of the fast bypass tag field to 1.

It is understandable that Spine1 also sends the host route for Host 6 to Leaf1. Leaf1 also generates the forwarding entry to reach Host 6 in the existing manner.

Host 1 intends to communicate with Host 6. Host 1 generates and sends IP Packet 1 to Leaf1, with the destination IP address of IP Packet 1 being the IP address of Host 6. Based on the destination IP address included in IP Packet 1, Leaf1 performs table searching and forwarding, sending IP Packet 1 to Spine1.

Through Port1, Spine1 receives IP Packet 1 and obtains the destination IP address from IP Packet 1. Spine1 searches the local forwarding table based on the destination IP address and obtains the forwarding entry that matches the destination IP address. The forwarding entry includes the egress interface field (Port3), the fast bypass tag field (1), and the next hop field (the IP address of the interface on Leaf3).

In response to determining the link between Spine1 and Leaf3 fails, the status of Port3 changes to down, and based on Port3, Spine1 determines from the forwarding entry that the value of the fast bypass tag field is 1. After excluding Port3 from the fast recovery leaf node group, Spine1 selects an interface from the remaining Port1 and Port2 as the interface to forward IP Packet 1 based on the existing flow-based hash method, in some examples determining Port2 as the interface to forward IP Packet 1.

Spine1 encapsulates an Ethernet header on the outer layer of IP Packet 1. The Ethernet header includes a source MAC address field, a destination MAC address field, and a type field.

Among them, the destination MAC address field is filled with the MAC address stored in the fast recovery destination MAC address field included in the fast recovery leaf node group. The source MAC address field is filled with the MAC address of Port2. The type field is filled with the network protocol used at the previous layer.

Spine2 generates IP Packet 2 and sends it to Leaf2 through Port2. After receiving IP Packet 2, Leaf2 obtains the destination MAC address from IP Packet 2. Leaf2 determines the destination MAC address being the MAC address of its own interface or a preconfigured MAC address.

In response to determining that the destination MAC address is the MAC address of its own interface or a preconfigured MAC address, Leaf2 determines performing split-horizon forwarding for IP Packet 2. The Leaf2 apparatus strips the Ethernet header from IP Packet 2 to obtain IP Packet 1. Based on the destination IP address included in IP Packet 1, Leaf2 searches the local forwarding table for split-horizon forwarding. By searching the local forwarding table, Leaf2 obtains multiple egress interfaces (Port4 connected to Spine1, Port5 connected to Spine2, Port6 connected to Spine3). Leaf2 excludes Port4, which received IP Packet 2, and selects an interface (in some examples, Port6) from the remaining Port5 and Port6 as the interface to forward IP Packet 2, based on the existing flow-based hash method.

Through Port6, Leaf2 forwards IP Packet 2 to Spine3, so that Spine3 forwards IP Packet 2 to Leaf3.

It is understandable that after excluding Port3 from the fast recovery leaf node group, Spine1 may also select Port1 as the interface to forward IP Packet 1. After IP Packet 2 arrives at Leaf1, Leaf1 may also forward IP Packet 2 based on the performing process of Leaf2 described above, which will not be repeated here.

Figure 4:
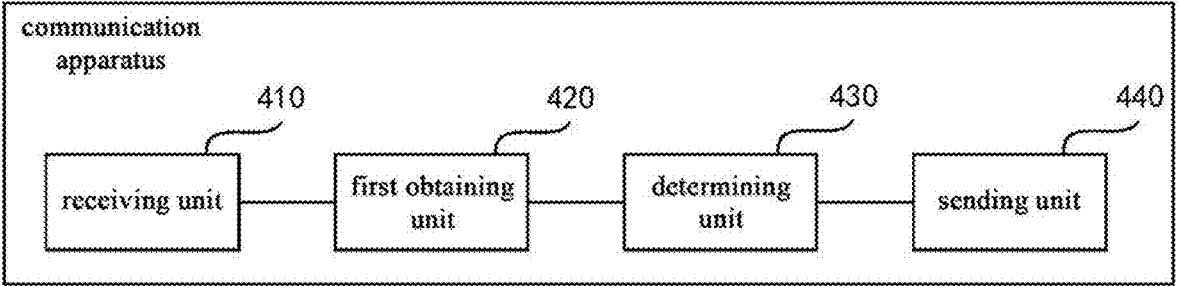
FIG. 4 is a schematic diagram of a structure of the communication apparatus provided in an example of the present disclosure.

Based on the same inventive concept, the example of the present disclosure also provides a communication apparatus corresponding to the communication method. Refer to FIG. 4, which illustrates the communication apparatus provided in the example of the present disclosure. The apparatus is applied to a spine node in a spine-leaf architecture network, which also includes a first leaf node within the architecture network. The apparatus includes:

a receiving unit 410, to receive a first IP packet sent by the first leaf node through a first interface;

a first obtaining unit 420, to obtain a forwarding entry for forwarding the first IP packet, wherein, the forwarding entry comprises an egress interface field and a fast bypass tag field, and the egress interface field being to instruct a second interface for forwarding the first IP packet;

a determining unit 430, to determine a third interface from a fast recovery leaf node group in response to determining that the second interface fails and the value of the fast bypass tag field is a first value, wherein the third interface is different from the second interface and connected to a second leaf node;

a sending unit 440, to send a second IP packet to the second leaf node through the third interface, wherein the second IP packet comprises a destination MAC address and the first IP packet, so that the second leaf node performs split-horizon forwarding for the second IP packet of the second IP packet based on the destination MAC address.

In some examples, the receiving unit 410 is further to receive a LLDP packet sent by each network device direct-connected within the spine-leaf architecture network, the LLDP packet comprising apparatus role information instructing the role of the network apparatus sending the LLDP packet within the spine-leaf architecture network;

The apparatus further includes: a generating unit (not shown in the figure), to generate a topology structure entry at local and storing the topology structure entry in a topology structure table, the topology structure entry comprising an interface identifier field and a peer apparatus role field;

the receiving unit 410, further to receive a first configuration instruction input by a user, the first configuration instruction comprising a fast recovery destination MAC address field;

an establishing unit (not shown in the figure), to issue the topology structure entry with the peer apparatus role field being leaf from the topology structure table to a data plane and establish the fast recovery leaf node group on the data plane, the fast recovery leaf node group comprising the interface identifier field, the peer apparatus role field, and the fast recovery destination MAC address field;

wherein, the MAC address stored in the fast recovery destination MAC address field is to fill the destination MAC address for the Ethernet header encapsulated in the outer layer of the second IP packet.

In some examples, the receiving unit 410 is further to receive a second configuration instruction input by a user, the second configuration instruction comprising an interface identifier field, a peer apparatus role field, and a fast recovery destination MAC address field;

The apparatus further includes: an establishing unit, to establish the fast recovery leaf node group on the data plane, the fast recovery leaf node group comprising the interface identifier field, the peer apparatus role field, and the fast recovery destination MAC address field;

wherein, the peer apparatus role field instructs that the role of the peer apparatus is leaf, and the MAC address stored in the fast recovery destination MAC address field is to fill the destination MAC address for the Ethernet header encapsulated in the outer layer of the second IP packet.

In some examples, the apparatus further includes:

a determining unit (not shown in the figure), to determine a fourth interface for forwarding an IP packet to a destination host in response to generating a forwarding entry to reach the destination host;

a second obtaining unit (not shown in the figure), to obtain a fast recovery leaf node group entry matching the fourth interface from the fast recovery leaf node group based on an interface identifier of the fourth interface;

an adding unit (not shown in the figure), to add a fast bypass tag field to the forwarding entry and set the value of the fast bypass tag field as the first value in response to determining that the fast recovery leaf node group entry instructs that the role of the peer apparatus connected with the fourth interface is leaf.

In some examples, the apparatus further includes:

a maintenance unit (not shown in the figure), to maintain the forwarding entry within a preset time in response to determining that the second interface fails.

In some examples, the first IP packet includes a destination IP address, and the apparatus further includes:

a convergence unit (not shown in the figure), to perform convergence processing on a host route which reached the destination IP address;

an update unit (not shown in the figure), to update the forwarding entry based on the converged host route;

a deleting unit (not shown in the figure), to delete the forwarding entry in response to determining that the forwarding entry is not updated within the preset time.

Therefore, by applying the communication apparatus provided by the present disclosure, the spine node receives the first IP packet sent by the first leaf node through the first interface; the spine node obtains the forwarding entry to forward the first IP packet, which includes the egress interface field and the fast bypass tag field, and the egress interface field is to instruct the second interface for forwarding the first IP packet; in response to determining that the second interface fails and the value of the fast bypass tag field is the first value, the spine node determines the third interface from the fast recovery leaf node group, which is different from the second interface and is connected to the second leaf node; the spine node sends the second IP packet to the second leaf node through the third interface, wherein the second IP packet includes the destination MAC address and the first IP packet, so that the second leaf node determines to perform split-horizon forwarding for the second IP packet based on the destination MAC address.

In this way, in response to determining that a link fails, fast bypass protection switching is achieved on the data plane, with sub-millisecond fast recovery for CPU forwarding within the network apparatus and microsecond-level or faster recovery speed for hardware forwarding chips. This solves the problems of flow interruption and slow convergence in response to determining that the existing leaf nodes rely on the control plane for route convergence.

Figure 5:
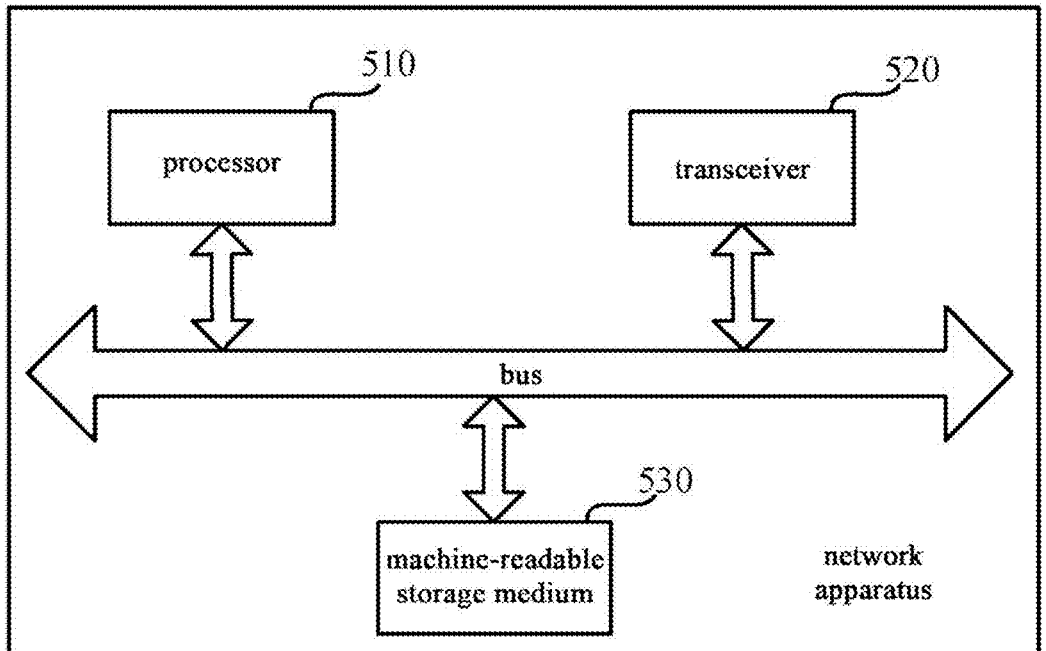
FIG. 5 is a schematic diagram of the hardware structural configuration of a network apparatus provided in an example of the present disclosure.

Based on the same inventive concept, the example of the present disclosure further provides a network apparatus, as shown in FIG. 5, which includes a processor 510, a transceiver 520, and a machine-readable storage medium 530.

The machine-readable storage medium 530 stores machine-executable instructions that may be executed by the processor 510. The processor 510 is prompted by the machine-executable instructions to execute the communication method provided in the example of the present disclosure. The communication apparatus shown in FIG. 4 aforementioned may be applied using the hardware structure of the network apparatus shown in FIG. 5.

The aforementioned computer-readable storage medium 530 may include Random Access Memory (RAM) and may also include Non-volatile Memory (NVM), such as at least one disk storage apparatus. In some examples, the computer-readable storage medium 530 may also be at least one storage apparatus located remotely from the aforementioned processor 510.

The aforementioned processor 510 may be a general-purpose processor, including a Central Processing Unit (CPU), a Network Processor (NP), etc.; it may also be a Digital Signal Processor (DSP), an Application Specific Integrated Circuit (ASIC), a Field-Programmable Gate Array (FPGA), or other programmable logic apparatuses, discrete gate or transistor logic apparatuses, and discrete hardware components.

In the example of the present disclosure, the processor 510 reads the machine-executable instructions stored in the machine-readable storage medium 530 and is prompted by the machine-executable instructions to enable the processor 510 itself and invoke the transceiver 520 to execute the communication method described in the aforementioned example of the present disclosure.

Figure 3:
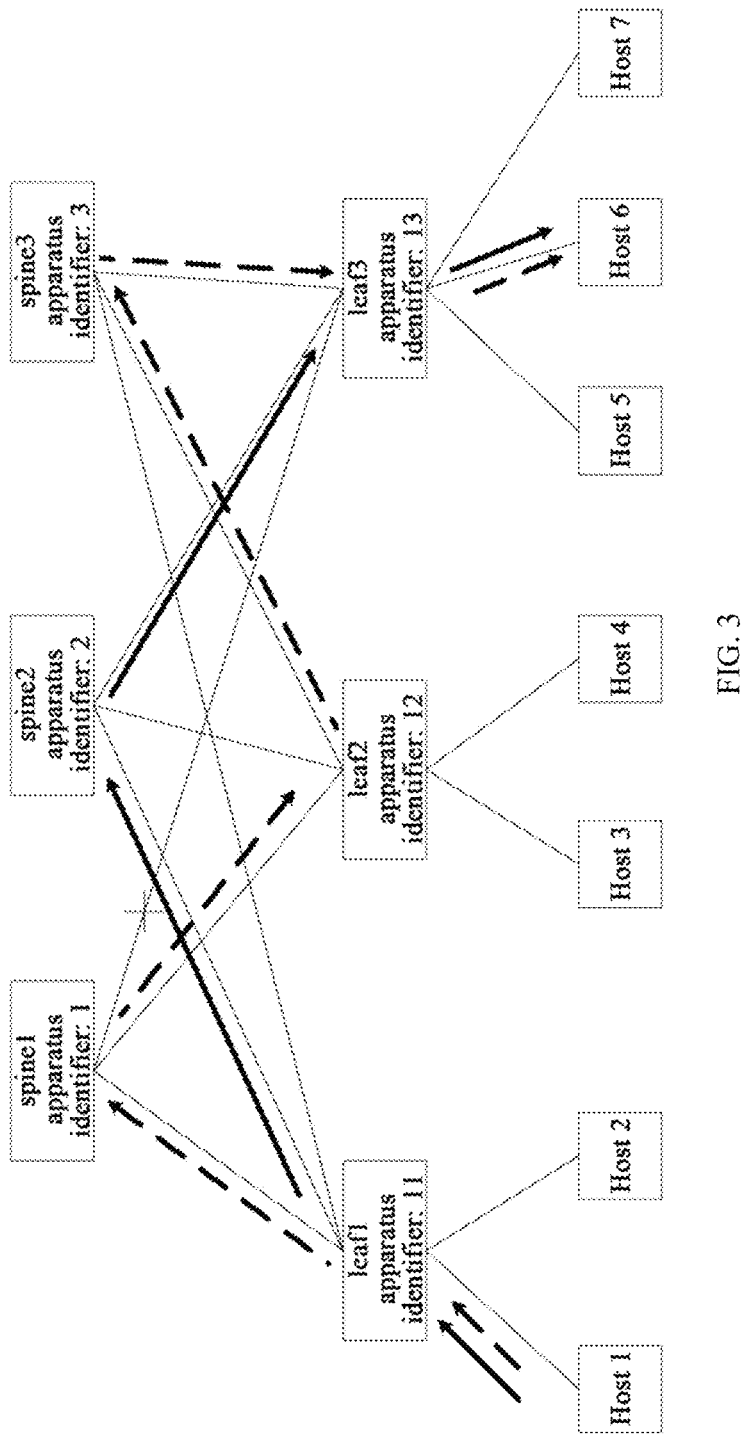
FIG. 3 is a schematic diagram of the spine-leaf topology architecture network provided in an example of the present disclosure.

In addition, the example of the present disclosure provides a machine-readable storage medium 530 that stores machine-executable instructions. In response to determining invoked and executed by the processor 510, the machine-executable instructions prompt the processor 510 itself and invoke the transceiver 520 to execute the communication method described in the aforementioned examples of the present disclosure, as illustrated in FIGS. 2 and 3.

The realization processes of the functions and roles of each unit in the aforementioned apparatuses are detailed specifically in the realization processes of the corresponding processes in the aforementioned methods, and will not be repeated here.

For the apparatus example, since the apparatus example corresponds to the method example, relevant parts may refer to the description of the method example. The apparatus examples described above are merely illustrative, and the units described as separate components may or may not be physically separated. The components displayed as units may or may not be physical units, that is, the components may be located in one place or distributed across multiple network units. Some or all of the modules may be selected to achieve the purpose of the present disclosure based on actual needs. Ordinary technicians in the field may understand and implement it without creative effort.

For the communication apparatus and machine-readable storage medium examples, since the method content involved is basically similar to the aforementioned method example, the description is relatively simple. Relevant parts may refer to the description of the method example.

What is described above are only the preferred examples of the present disclosure and are not intended to limit the present disclosure. Any modifications, equivalent substitutions, improvements, etc., made within the spirit and principles of the present disclosure, should be included within the scope of protection of the present disclosure.

What is claimed is:

1. A communication method, applied to a spine node, wherein the method comprises:

receiving a first internet protocol, IP, packet sent by a first leaf node through a first interface; wherein the first leaf node is located in a spine-leaf architecture network which comprises the spine node;

obtaining a forwarding entry for forwarding the first IP packet; wherein the forwarding entry comprises an egress interface field and a fast bypass tag field, with the egress interface field being to instruct a second interface for forwarding the first IP packet;

determining a third interface from a fast recovery leaf node group in response to determining that the second interface fails and a value of the fast bypass tag field is a first value, wherein the third interface is different from the second interface and is connected to a second leaf node;

sending a second IP packet to the second leaf node through the third interface, the second IP packet comprising a destination media access control, MAC, address and the first IP packet, so that the second leaf node performs split-horizon forwarding for the second IP packet based on the destination MAC address.

2. The method of claim 1, wherein, prior to the receiving the first IP packet sent by the first leaf node through the first interface, the method further comprises:

receiving a link layer discovery protocol, LLDP, packet sent by each network apparatus direct-connected within the spine-leaf architecture network; wherein each LLDP packet comprises apparatus role information instructing a role of the network apparatus that sends the LLDP packet within the spine-leaf architecture network;

generating a topology structure entry locally and storing the topology structure entry in a topology structure table; wherein the topology structure entry comprises an interface identifier field and a peer apparatus role field;

receiving a first configuration instruction input by a user; wherein the first configuration instruction comprises a fast recovery destination MAC address field;

forwarding a topology structure entry, which is stored in the topology structure table and with a peer apparatus role field being leaf, to a data plane, and establishing the fast recovery leaf node group on the data plane; wherein the fast recovery leaf node group comprises the interface identifier field, the peer apparatus role field, and the fast recovery destination MAC address field;

wherein, the MAC address stored in the fast recovery destination MAC address field is to fill the destination MAC address included in an Ethernet header encapsulated in the outer layer of the second IP packet.

3. The method of claim 2, wherein, prior to the receiving the first IP packet sent by the first leaf node through the first interface, the method further comprises:

determining a fourth interface for forwarding an IP packet to a destination host in response to generating a forwarding entry reaching the destination host;

obtaining a fast recovery leaf node group entry matching the fourth interface from the fast recovery leaf node group based on an interface identifier of the fourth interface;

adding the fast bypass tag field to the forwarding entry, and setting the value of the fast bypass tag field as the first value in response to determining that the fast recovery leaf node group entry instructs that a role of a peer apparatus connected with the fourth interface is a leaf.

4. The method of claim 1, wherein, prior to the receiving the first IP packet sent by the first leaf node through the first interface, the method further comprises:

receiving a second configuration instruction input by a user; wherein the second configuration instruction comprises an interface identifier field, a peer apparatus role field, and a fast recovery destination MAC address field;

establishing the fast recovery leaf node group on a data plane; wherein the fast recovery leaf node group comprises the interface identifier field, the peer apparatus role field, and the fast recovery destination MAC address field;

wherein, the peer apparatus role field instructs that a role of a peer apparatus is a leaf, and the MAC address stored in the fast recovery destination MAC address field is to fill the destination MAC address included in an Ethernet header encapsulated in the outer layer of the second IP packet.

5. The method of claim 3, wherein, prior to the receiving the first IP packet sent by the first leaf node through the first interface, the method further comprises:

determining a fourth interface for forwarding an IP packet to a destination host in response to generating a forwarding entry reaching the destination host;

obtaining a fast recovery leaf node group entry matching the fourth interface from the fast recovery leaf node group based on an interface identifier of the fourth interface;

adding the fast bypass tag field to the forwarding entry, and setting the value of the fast bypass tag field as the first value in response to determining that the fast recovery leaf node group entry instructs that a role of a peer apparatus connected with the fourth interface is a leaf.

6. The method of claim 1, further comprising:

maintaining the forwarding entry within a preset time in response to determining that the second interface fails.

7. The method of claim 6, wherein the first IP packet comprises a destination IP address, and the method further comprises:

performing route convergence for a host route reaching the destination IP address;

updating the forwarding entry based on a converged host route;

deleting the forwarding entry in response to determining that the forwarding entry is not updated within the preset time.

8. A communication apparatus, applied to a spine node in a spine-leaf architecture network, the apparatus comprising:

a receiving unit, to receive a first IP packet sent by a first leaf node through a first interface; wherein the first leaf node is located in a spine-leaf architecture network which comprises the spine node;

a first obtaining unit, to obtain a forwarding entry for forwarding the first IP packet; wherein the forwarding entry comprises an egress interface field and a fast bypass tag field, with the egress interface field being to instruct a second interface for forwarding the first IP packet;

a determining unit, to determine a third interface from a fast recovery leaf node group in response to determining that the second interface fails and a value of the fast bypass tag field is a first value, wherein the third interface is different from the second interface and is connected to a second leaf node;

a sending unit, to send a second IP packet to the second leaf node through the third interface, the second IP packet comprising a destination MAC address and the first IP packet, so that the second leaf node performs split-horizon forwarding for the second IP packet based on the destination MAC address.

9. The apparatus of claim 8, wherein the apparatus further comprises an establishing unit and a generating unit, wherein the receiving unit, further to receive a LLDP packet sent by each network apparatus direct-connected within the spine-leaf architecture network; wherein each LLDP packet comprises apparatus role information instructing a role of the network apparatus that sends the LLDP packet within the spine-leaf architecture network;

the generating unit, to generate a topology structure entry locally and storing the topology structure entry in a topology structure table; wherein the topology structure entry comprises an interface identifier field and a peer apparatus role field;

the receiving unit, further to receive a first configuration instruction input by a user; wherein the first configuration instruction comprises a fast recovery destination MAC address field;

the establishing unit, to forward a topology structure entry in the topology structure table with a peer apparatus role field being leaf to a data plane and establish the fast recovery leaf node group on the data plane, the fast recovery leaf node group comprising the interface identifier field, the peer apparatus role field, and the fast recovery destination MAC address field;

wherein, the MAC address stored in the fast recovery destination MAC address field is to fill the destination MAC address included in an Ethernet header encapsulated in the outer layer of the second IP packet.

10. The apparatus of claim 9, wherein the apparatus further comprises:

a determining unit, to determine a fourth interface for forwarding an IP packet to a destination host in response to generating a forwarding entry to reach the destination host;

a second obtaining unit, to obtain a fast recovery leaf node group entry matching the fourth interface from the fast recovery leaf node group based on an interface identifier of the fourth interface;

an adding unit, to add the fast bypass tag field to the forwarding entry and setting the value of the fast bypass tag field as the first value in response to determining that the fast recovery leaf node group entry instructs that a role of a peer apparatus connected with the fourth interface is a leaf.

11. The apparatus of claim 8, wherein the apparatus further comprises an establishing unit, the receiving unit, further to receive a second configuration instruction input by a user; wherein the second configuration instruction comprises an interface identifier field, a peer apparatus role field, and a fast recovery destination MAC address field;

the establishing unit, to establish the fast recovery leaf node group on a data plane; wherein the fast recovery leaf node group comprises the interface identifier field, the peer apparatus role field, and the fast recovery destination MAC address field;

wherein, the peer apparatus role field instructs that a role of a peer apparatus is a leaf, and the MAC address stored in the fast recovery destination MAC address field is to fill the destination MAC address included in an Ethernet header encapsulated in the outer layer of the second IP packet.

12. The apparatus of claim 11, wherein the apparatus further comprises:

a determining unit, to determine a fourth interface for forwarding an IP packet to a destination host in response to generating a forwarding entry to reach the destination host;

a second obtaining unit, to obtain a fast recovery leaf node group entry matching the fourth interface from the fast recovery leaf node group based on an interface identifier of the fourth interface;

an adding unit, to add the fast bypass tag field to the forwarding entry and setting the value of the fast bypass tag field as the first value in response to determining that the fast recovery leaf node group entry instructs that a role of a peer apparatus connected with the fourth interface is a leaf.

13. The apparatus of claim 8, wherein the apparatus further comprises:

a maintaining unit, to maintain the forwarding entry within a preset time in response to determining that the second interface fails.

14. The apparatus of claim 13, wherein the first IP packet comprises a destination IP address, and the apparatus further comprises:

a convergence unit, to perform route convergence on a host route reaching the destination IP address;

an updating unit, to update the forwarding entry based on a converged host route;

a deleting unit, to delete the forwarding entry in response to determining that the forwarding entry is not updated within the preset time.

* * * * *